(12) United States Patent
Kim et al.

(10) Patent No.: US 11,579,836 B2
(45) Date of Patent: Feb. 14, 2023

(54) ELECTRONIC DEVICE AND METHOD FOR CONTROLLING AUDIO OUTPUT THEREOF

(71) Applicant: Samsung Electronics Co., Ltd., Gyeonggi-do (KR)

(72) Inventors: Heejin Kim, Gyeonggi-do (KR); Ochae Kwon, Gyeonggi-do (KR); Inje Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/178,440

(22) Filed: Feb. 18, 2021

(65) Prior Publication Data
US 2021/0255823 A1 Aug. 19, 2021

(30) Foreign Application Priority Data
Feb. 19, 2020 (KR) .......................... 10-2020-0020715

(51) Int. Cl.
*G06F 3/16* (2006.01)
*H04R 1/10* (2006.01)
*H04W 4/80* (2018.01)

(52) U.S. Cl.
CPC ........... *G06F 3/165* (2013.01); *H04R 1/1041* (2013.01); *H04W 4/80* (2018.02); *H04R 2420/07* (2013.01)

(58) Field of Classification Search
CPC ........ G06F 3/165; H04W 4/80; H04R 1/1041; H04R 2420/07
See application file for complete search history.

(56) References Cited

U.S. PATENT DOCUMENTS 8,768,494 B1 * 7/2014 Stroud .................... G06F 3/165
700/94
9,851,937 B2 12/2017 Jang
(Continued)

FOREIGN PATENT DOCUMENTS

| KR | 10-0692182 B1 | 3/2007 |
| KR | 10-1178252 B1 | 8/2012 |
| KR | 10-1296039 B1 | 8/2013 |

OTHER PUBLICATIONS

International Search Report dated Jun. 9, 2021.

*Primary Examiner* — Joseph Saunders, Jr.
(74) *Attorney, Agent, or Firm* — Cha & Reiter, LLC

(57) ABSTRACT

In various embodiments, an electronic device comprises: a wireless communication module; a memory storing a priority of a plurality of external electronic devices; an output module; and a processor operatively connected to the wireless communication module, the memory, and the output module, wherein the processor is configured to: control the wireless communication module to establish a first wireless communication channel with a first external electronic device; control the wireless communication module to establish a second wireless communication channel with a second external electronic device; control the output module to output first audio data received through the first wireless communication channel; identify a priority of the first external electronic device and a priority of the second external electronic device when receiving second audio data through the second wireless communication channel while outputting the first audio data; identify a type of the first audio data and a type of the second audio data; adjust an output parameter of the first audio data and an output parameter of the second audio data based on the priority of the first external electronic device, the priority of the second external electronic device, the type of the first audio data, and the (Continued)

type of the second audio data; and output the first audio data using the adjusted output parameter of the first audio data and the second audio data using the adjusted output parameter of the second audio data through the output module. Various other embodiments are possible.

20 Claims, 11 Drawing Sheets

(56) References Cited

U.S. PATENT DOCUMENTS

| | | | |
|---|---|---|---|
| 10,959,022 B1 | 3/2021 | Baumbach | |
| 2008/0268771 A1 | 10/2008 | Masuda | |
| 2009/0061769 A1 | 3/2009 | Zimbric et al. | |
| 2009/0187967 A1 | 7/2009 | Rostaing et al. | |
| 2009/0274326 A1 | 11/2009 | Jia et al. | |
| 2010/0150383 A1 | 6/2010 | Sampat | |
| 2010/0211199 A1* | 8/2010 | Naik | G10L 21/00 700/94 |
| 2013/0316679 A1* | 11/2013 | Miller | H04M 3/568 455/412.1 |
| 2014/0219484 A1* | 8/2014 | Zellner | H04R 1/1041 381/311 |
| 2017/0357475 A1* | 12/2017 | Lee | G06Q 10/10 |
| 2018/0205813 A1 | 7/2018 | Watson et al. | |
| 2018/0321901 A1* | 11/2018 | Sunstrum | H04R 1/1041 |
| 2019/0357000 A1 | 11/2019 | Karkkainen et al. | |
| 2020/0314524 A1* | 10/2020 | Querze, III | H04S 7/304 |
| 2021/0112367 A1* | 4/2021 | Hynds | H04L 65/1069 |

* cited by examiner

ELECTRONIC DEVICE AND METHOD FOR CONTROLLING AUDIO OUTPUT THEREOF

CROSS-REFERENCE TO RELATED APPLICATION(S)

This application is based on and claims priority under 35 U.S.C. 119 to Korean Patent Application No. 10-2020-0020715, filed on Feb. 19, 2020, in the Korean Intellectual Property Office, the disclosure of which is incorporated by reference herein in its entirety.

BACKGROUND

1) Field

Various embodiments relate to an electronic device and a method for controlling an audio output thereof.

2) Description of Related Art

Electronic devices (for example, mobile terminals, smartphones, or wearable terminals) may provide various functions. The functions can include, for example and not limited to, a music playback function, a navigation function, a short-range wireless communication (e.g., Bluetooth, Wi-Fi, or near-field communication (NFC)) function, a fingerprint recognition function, and an electronic payment function.

Recent electronic devices may be connected to multiple external electronic devices in a wired or wireless manner. For example, an electronic device may simultaneously establish wireless communication channels with multiple external electronic devices by using a multi-point technology, and may receive audio data from the multiple electronic devices.

The above information is presented as background information only to assist with an understanding of the disclosure. No determination has been made, and no assertion is made, as to whether any of the above might be applicable as prior art with regard to the disclosure.

SUMMARY

The electronic device may receive second audio data from a second external electronic device while outputting first audio data received from a first external electronic device. The user may play music (second audio data) through the second external electronic device while music (first audio data) is already played through the first external electronic device. In such a case, the electronic device may maintain output of the first audio data and may mute output of the second audio data. The foregoing may fail to reflect the intention of the user who wants to output the second audio data and mute the first audio data. If the user wants the electronic device to switch from outputting the first audio data to outputting the second audio data, the user may have to stop output of the first audio data, or may have to request an output change through an input device of the electronic device.

In addition, the electronic device may mix and output the first audio data and the second audio data without separate processing, thereby making it difficult to identify to which external electronic device specific audio data corresponds.

Various embodiments may provide an electronic device capable of controlling the output of audio data so as to reflect the user's intention, and a method for controlling the audio output thereof.

In addition, Various embodiments may provide an electronic device and a method for controlling the audio output thereof, wherein the user is enabled to distinguish an external electronic device corresponding to each piece of audio data or to distinguish a piece of audio data corresponding to each external electronic device.

In various embodiments, an electronic device comprises: a wireless communication module; a memory storing a priority of a plurality of external electronic devices; an output module; and a processor operatively connected to the wireless communication module, the memory, and the output module, wherein the processor is configured to: control the wireless communication module to establish a first wireless communication channel with a first external electronic device; control the wireless communication module to establish a second wireless communication channel with a second external electronic device; control the output module to output first audio data received through the first wireless communication channel; identify a priority of the first external electronic device and a priority of the second external electronic device when receiving second audio data through the second wireless communication channel while outputting the first audio data; identify a type of the first audio data and a type of the second audio data; adjust an output parameter of the first audio data and an output parameter of the second audio data based on the priority of the first external electronic device, the priority of the second external electronic device, the type of the first audio data, and the type of the second audio data; and output the first audio data using the adjusted output parameter of the first audio data and the second audio data using the adjusted output parameter of the second audio data through the output module.

In various embodiments, a method for controlling audio output of an electronic device, the method comprises: establishing a first wireless communication channel with a first external electronic device; establishing a second wireless communication channel with a second external electronic device; outputting, through an output module, first audio data received through the first wireless communication channel; identifying a priority of the first external electronic device and a priority of the second external electronic device when receiving second audio data through the second wireless communication channel while outputting the first audio data; identifying a type of the first audio data and a type of the second audio data; adjusting an output parameter of the first audio data and an output parameter of the second audio data based on the priority of the first external electronic device and the priority of the second external electronic device, the type of the first audio data, and the type of the second audio data; and outputting the first audio data using the adjusted output parameter of the first audio data and the second audio data the adjusted output parameter of the second audio data through the output module.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
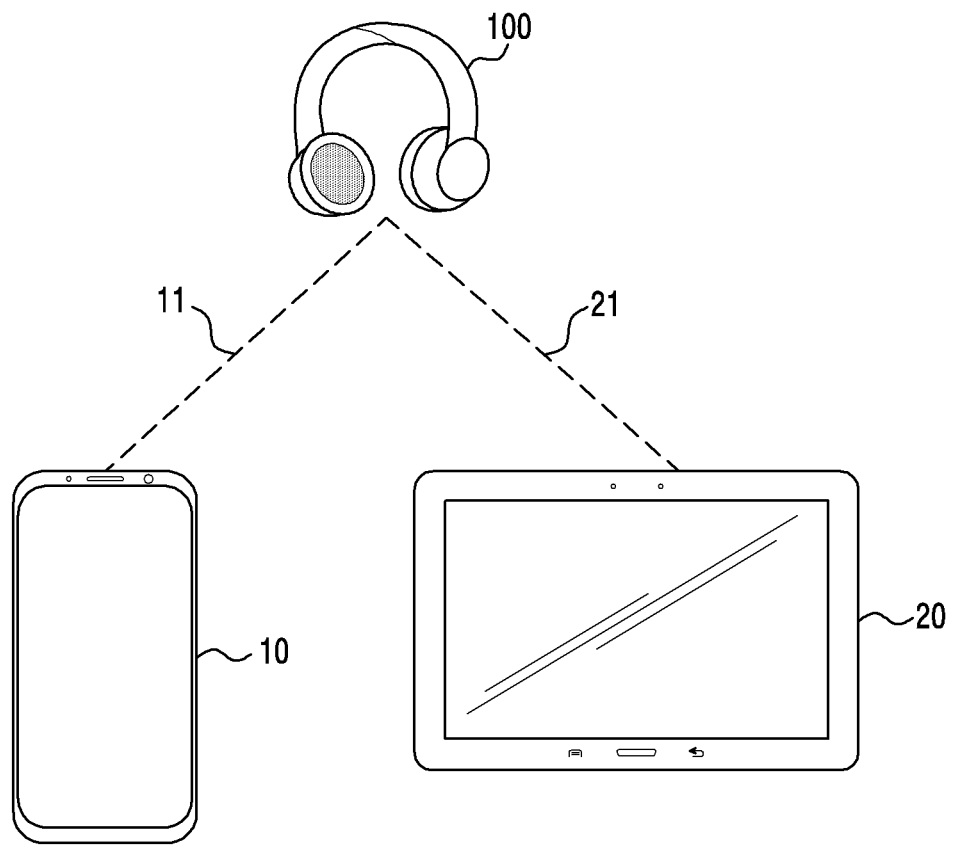
FIG. 1 illustrates an example in which an electronic device is connected to a plurality of external electronic devices via wireless communication according to an embodiment.

Hereinafter, various embodiments will be described with reference to the accompanying drawings. Although specific embodiments are illustrated in the drawings and a related detailed description is disclosed in this document, these embodiments are not intended to limit various embodiments disclosed herein to a specific form. For example, it will be apparent to those skilled in the art to which the disclosure pertains that various changes and modifications can be made to the embodiments.

Figure 2:
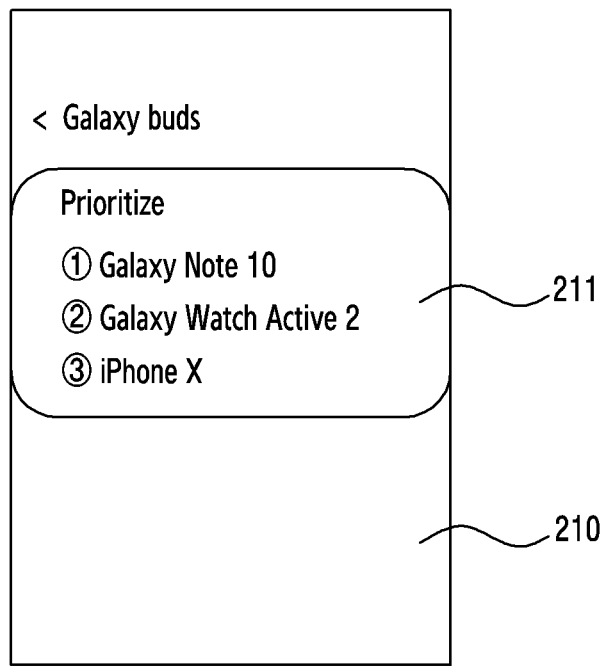
FIG. 2 illustrates an example of a user interface for prioritization according to an embodiment.

FIG. 1 illustrates an example in which an electronic device is connected to a plurality of external electronic devices via wireless communication according to an embodiment, and FIG. 2 illustrates an example of a user interface for prioritization according to an embodiment.

Referring to FIG. 1 and FIG. 2, the electronic device 100 may receive first audio data 11 from a first external electronic device 10 and second audio data 21 from a second external electronic device 20. The electronic device 100 may initially output the first audio data 11 from the first external electronic device 10. While outputting the first audio data 11 from the first external electronic device 10, the electronic device 100 may receive second audio data 21 from the second external electronic device 20. The electronic device 100 may determine a priority for the first audio data 11 and the second audio data 21 based on a type (e.g., ringtone, media, notification, system) and a priority based on the types of the first external electronic device 10 and the second external electronic device 20. The prioritization of the type can be predetermined, such as listed in Table 1. Based on the priority, the electronic device 100 can adjust the output parameter of the first audio data 11 and the second audio data 21 in a manner that is likely to reflect user's intentions.

According to an embodiment, the electronic device 100 according to an embodiment may establish short-range wireless communication (e.g., Bluetooth) with at least two external electronic devices 10 and 20. For example, the electronic device 100 may establish a first wireless communication channel (or link) 11 with a first external electronic device 10 and may establish a second wireless communication channel (21) with a second external electronic device 20. According to an embodiment, the electronic device 100 may include, for example, a Bluetooth headset, Bluetooth earphones, and a Bluetooth speaker that are capable of receiving and outputting audio data from an external electronic device. The external electronic devices 10 and 20 may include, for example, a smartphone, a tablet PC, and a laptop computer that are capable of transmitting audio data to the electronic device.

According to an embodiment, the electronic device 100 may support multipoint technology according to Bluetooth protocols. The first wireless communication channel and the second wireless communication channel may be established using one of a plurality of profiles (e.g., Advanced Audio Distribution Profile (A2DP), Audio/Video Remote Control Profile (AVRCP)), Headset Profile (HSP), Hands-Free Profile (HFP), Human Interface Device (HID), and Enhanced Data Rate (EDR)) supported by the Bluetooth protocols. The first wireless communication channel and the second wireless communication channel may have the same profile or different profiles.

According to an embodiment, the electronic device 100 may receive and output audio data from each of the plurality of external electronic devices 10 and 20. For example, the electronic device 100 may receive first audio data from the first external electronic device 10 and may output the received first audio data through an output module (e.g., a speaker). The electronic device 100 may receive second audio data from the second external electronic device 20 while receiving and outputting the first audio data.

Upon receiving the second audio data, the electronic device 100 may identify the priority of the first external electronic device 10 and the second external electronic device 20 and/or the type of the first and second audio data. The type may be classified into at least two groups, and each group may include at least one subgroup. For example, the type may be classified into ringtone, media, notification, and system types as shown in Table 1.

TABLE 1

| Type (group) | Sound type (subgroup) |
| --- | --- |
| Ringtone | Ringtone |
| Media | Music player, Video player, Radio, Text-to-speech (TTS) |
| Notification | SMS/MMS, E-mail, Calendar |
| System | Touch, Power, Lock/Unlock, Camera shutter sound, Video recording start/end, Charging start, Low battery |

Table 1 is merely an example and does not limit embodiments disclosed herein. For example, the type may further include other groups (e.g., Call) in addition to the ringtone, media, notification, and system types.

In another example, at least some of the groups may be integrated into and classified as one type. For example, the notification and media types may be classified as the same group.

In still another example, at least some of the groups may be classified into at least two groups. For example, the ringtone type may be classified into a ringtone type specified by a user for a specific counterpart or group (e.g., family, friends, and coworkers) and a default ringtone type, the media type may not be classified, and the notification type may be classified into a first sound effect indicating reception of a push message associated with at least one application specified by the user, a second sound effect indicating reception of a push message associated with an unspecified application, a third sound effect (alarm sound) indicating a previously stored schedule or event, and a fourth sound effect associated with other notifications, and the system type may be classified into a first sound effect associated with a user input (e.g., a touch input), a second sound effect indicating the state of the electronic device (e.g., power-on/off, a camera shutter sound, charging start, or low battery), and a third sound effect associated with other system notifications.

In various embodiments, the highest priority can be assigned to a ringtone, followed by media, followed by a notification of a message, calendar, and a system. In various embodiments, an incoming ringtone can automatically mute all media.

The electronic device 100 may adjust an output parameter of the first audio data 11 and the second audio data 21 based on the identified priority of the first and second external electronic devices 10 and 20 and/or the identified type of the first audio data 11 and the second audio data 21. For example, the electronic device 100 may adjust the volume of the first audio data 11 and the second audio data 21. In another example, the electronic device 100 may provide a sense of space by controlling output of the first audio data 11 and the second audio data 21. A detailed description will be described with reference to FIG. 5A to FIG. 6.

The priority may be determined based on a connection history or a playback history. For example, the electronic device 100 may set a high priority for an external electronic device connected most recently or an external electronic device that has played audio data most recently.

The priority may be determined based on the type of audio data. The electronic device 100 may set the highest priority for an external electronic device that provides audio data corresponding to a ringtone. For example, the priority according to the type of audio data may be set as "ringtone>media>notification=system". This example is merely for illustration and does not limit embodiments disclosed herein.

The priority may also be determined based on a predefined setting. For example, the electronic device 100 may prioritize a phone-type external electronic device, a tablet-type external electronic device, and a wearable-type external electronic device in order based on the predefined setting.

The priority may also be determined based on a user setting. For example, as illustrated in FIG. 2, the electronic device 100 may provide a user interface 210 for prioritization when detecting that a plurality of external electronic devices is connected. The user interface 210 may include a list 211 of the connected external electronic devices. The user may change the priority of a device on the list by touching and dragging the device. For example, the user may change a third item "iPhone X", which is a third priority, to a second priority by touching and dragging the third item to a position between first and second items. In this case, a second priority "Galaxy Watch Active2" may be changed to a third priority. Various methods for changing the priority may be used without being limited to the above example.

When the electronic device 100 does not include a display as in FIG. 1, the user may perform prioritization using the first external electronic device 10 or the second external electronic device 20. For example, the user interface 210 may be displayed on a display of the first external electronic device 10 or the second external electronic device 20.

Figure 3:
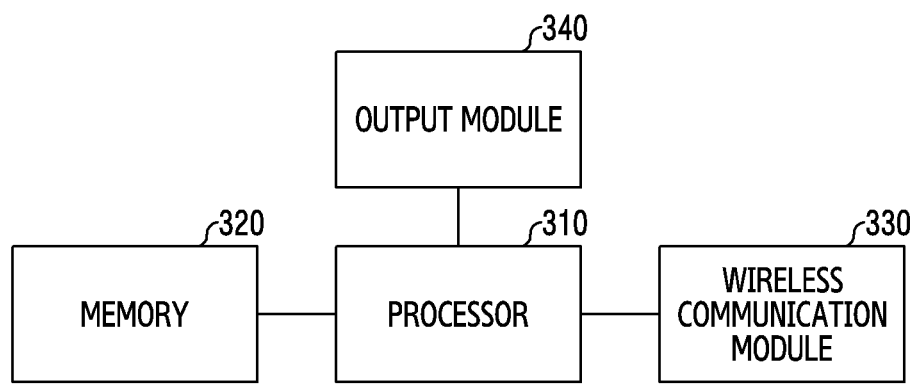
FIG. 3 is a block diagram illustrating the configuration of an electronic device according to an embodiment.

FIG. 3 is a block diagram illustrating the configuration of an electronic device, according to an embodiment.

Referring to FIG. 3, the electronic device 300 (e.g., the electronic device 100) according to an embodiment may include a processor 310, a memory 320, a wireless communication module 330, and an output module 340.

The wireless communication module 330 is configured to establish communication channels with the first external electronic device 10 and the second external electronic device 20, as well as other external electronic devices. The wireless communication module 330 can receive first audio data 11, second audio data 21, as well as other audio data over the communication channel. The processor 310 adjusts the output parameter of the first audio data 11, second audio data 21, and any other audio data. The output module 340 can include a speaker, and outputs the first audio data 11, second audio data 21, and any other audio data according to the adjusted output parameters. The memory 320 can store criteria for determining the adjusted output parameters. For example, the memory 320 can correlate media types and priorities, and/or devices and priorities.

The processor 310 may control output of audio data to output module 340. For example, when audio data is received from a plurality of external electronic devices, the processor 310 may selectively output the audio data or may mix and output the audio data based on the priority of the external electronic devices and the type of audio data. Alternatively, the processor 310 may output the audio data such that one of the external electronic devices, e.g., first external electronic device 10, sounds as if it is close to the electronic device 300, while the other external electronic device, e.g., second external electronic device 20, is a distance away (now referred to as a "sense of space" is provided. A detailed description will be described with reference to FIG. 4 to FIG. 6.

The memory 320 may store instructions that, when executed, cause the processor 310 to receive and output pieces of audio data from external electronic devices. The memory 320 may store the priority of connected external electronic devices.

The wireless communication module 330 may establish a short-range wireless communication channel with at least one external electronic device. For example, the wireless communication module 330 may be a Bluetooth communication module.

The wireless communication module 330 may receive first audio data from a first external electronic device and may receive second audio data from a second external electronic device. Here, a frame transmitting the first audio data may include information about the type of the first audio data in a header. Further, a frame transmitting the second audio data may include information about the type of the second audio data in a header.

When receiving the second audio data from the second external electronic device while outputting the first audio data, the wireless communication module 330 may transmit a signal for requesting a pause in playback of the first audio data to the first external electronic device.

The output module 340 may output an audio signal corresponding to audio data. For example, the output module 340 may be a speaker. The output module 340 may include a plurality of speakers.

According to various embodiments of the disclosure, an electronic device (e.g., the electronic device 100, 300) may comprise: a wireless communication module (e.g., the wireless communication module 330); a memory (e.g., the memory 320) configured to store a priority of a plurality of external electronic devices; an output module (e.g., the output module 340, such speaker(s)); and a processor (e.g., the processor 310) operatively connected to the wireless communication module, the memory, and the output module. The processor may be configured to: control the wireless communication module to establish a first wireless communication channel (e.g., the first wireless communication channel 11) with a first external electronic device (e.g., the first external electronic device 10); control the wireless communication module to establish a second wireless communication channel (e.g., the second wireless communication channel 21) with a second external electronic device (e.g., the second external electronic device 20); control the output module to output first audio data received through the first wireless communication channel; identify a priority of the first external electronic device and a priority of the second external electronic device when receiving second audio data through the second wireless communication channel while outputting the first audio data; identify a type of the first audio data and a type of the second audio data; adjust an output parameter of the first audio data and an output parameter of the second audio data based on the priority of the first external electronic device, the priority of the second external electronic device, the type of the first audio data, and the type of the second audio data; and output the first audio data using the adjusted output parameter of the first audio data and the second audio data using the adjusted output parameter of the first audio data through the output module.

The processor may be further configured to determine the priority of the first external electronic device and the priority of the second external electronic device based on a connection history or a playback history, the type of the first audio data and the type of the second audio data, or a predefined setting or a user setting.

The type of the first audio data and the type of the second audio data may be classified into at least two groups, and each group comprises at least one subgroup.

The processor may be further configured to adjust the output parameter of the first audio data and the output parameter of the second audio data by controlling a volume of the first audio data and a volume of the second audio data.

When the priority of the first external electronic device is high, the processor may be further configured to maintain the volume of the first audio data received from the first external electronic device and to reduce the volume of the second audio data received from the second external electronic device by a specified value.

When receiving audio data of a media type from the second external electronic device while receiving and outputting audio data of a media type from the first external electronic device, the processor may be further configured to request the first external electronic device to pause playback of the audio data of the media type and to control the audio data of the media type received from the second external electronic device to be output at a volume of 100%.

When receiving audio data of a media type from the second external electronic device while receiving and outputting audio data of a media type from the first external electronic device, the processor may be further configured to change the volume of the audio data of the media type received from the first external electronic device to 0% and to control the audio data of the media type received from the second external electronic device to be output at a volume of 100%.

When receiving audio data of a media type from the second external electronic device while receiving and outputting audio data of a media type from the first external electronic device, the processor may be further configured to change the volume of the audio data of the media type received from the first external electronic device to a specified value that is greater than 0% and is less than or equal to 100% and to control the audio data of the media type received from the second external electronic device to be output at a volume of 100%.

The processor may be further configured to adjust, when the first external electronic device has a high priority and the second external electronic device has a low priority, the output parameter of the first audio data and the output parameter of the second audio data such that the first audio data and second output data are output at volumes corresponding to the first external device being closer to the electronic device than the second external electronic device.

The processor may be further configured to identify a distance to each external electronic device based on a strength of a wireless signal of the first external electronic device and a strength of a wireless signal of the second external electronic device and to adjust the output parameter of the first audio data and the output parameter of the second audio data according to the identified distance to provide a sense of space.

Figure 4:
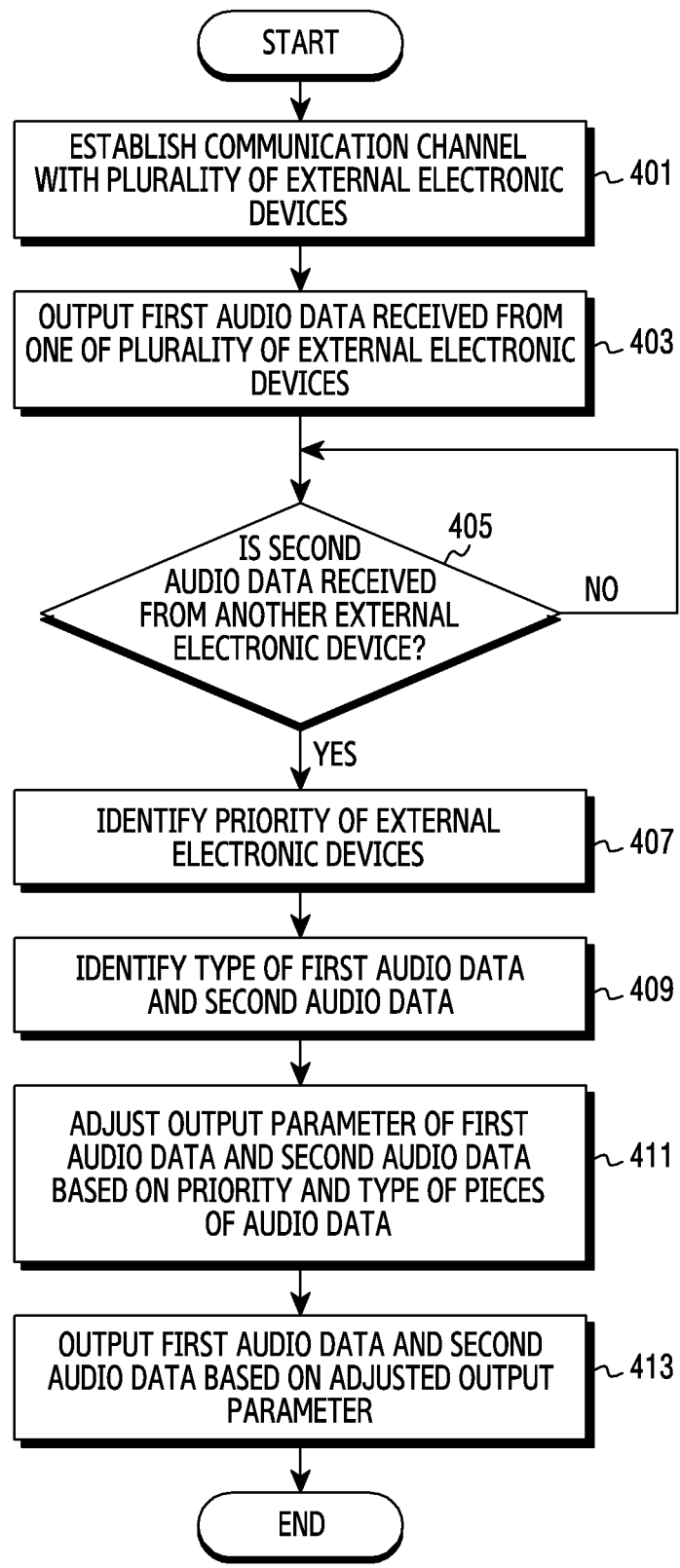
FIG. 4 is a flowchart illustrating a method for an electronic device to control audio output according to an embodiment.

FIG. 4 is a flowchart illustrating a method for an electronic device to control audio output according to an embodiment.

Referring to FIG. 4, in operation 401, a processor (e.g., the processor 310) of an electronic device (e.g., the electronic device 100 or the electronic device 300) according to an embodiment may establish a communication channel with a plurality of electronic devices (e.g., the first external electronic device 10 and the second external electronic device 20). For example, the processor may establish a first wireless communication channel with a first external electronic device and a second wireless communication channel with a second external electronic device using a wireless communication module (e.g., the wireless communication module 330). Here, the wireless communication module may be a short-range wireless communication module (e.g., a Bluetooth communication module), and the first wireless communication channel and the second wireless communication channel may be established using one of a plurality of profiles supported by Bluetooth protocols. The first wireless communication channel and the second wireless communication channel may be established using the same profile or different profiles.

In operation 403, the processor may output first audio data received from one of the plurality of external electronic devices. For example, when the first audio data is received from the first external electronic device through the first wireless communication channel, the processor may output the received first audio data through an output module (e.g., the output module 340) (e.g., a speaker).

In operation 405, the processor may identify whether second audio data is received from another external electronic device. For example, the processor may identify whether the second audio data is received from the second external electronic device 20 through the second wireless communication channel.

When no second audio data is received as a result of identification in operation 405, the processor may maintain operation 405. According to an embodiment, when the first audio data is no longer received from the first external electronic device, the processor may return to operation 403 and may wait to receive the first audio data from one of the plurality of external electronic devices.

When the second audio data is received as a result of identification in operation 405, the processor may identify the priority of the external electronic devices in operation 407. The priority may be determined based on a connection history or a playback history, may be determined based on the type of audio data, or may be determined based on a predefined setting or a user setting.

In operation 409, the processor may identify the type of the first audio data and the second audio data. The type may include ringtone, media, notification, and system types. This example is merely for illustration and does not limit embodiments disclosed herein. For example, the type may further include a new type in addition to the ringtone, media, notification, and system types, or at least some of these types may be integrated into and classified as one type or may be subdivided into at least two types. Information about the type may be included in a header of a frame transmitting audio data.

In operation 411, the processor may adjust an output parameter of the first audio data and the second audio data based on the priority and the type of the pieces of audio data. For example, the processor may control at least one of the volume or a sense of space of the first audio data and the second audio data. A detailed description will be described with reference to FIG. 5A to FIG. 6.

In operation 413, the processor may output the first audio data and the second audio data through the output module based on the adjusted output parameter.

Although not shown, when the first audio data or the second audio data is no longer received after operation 413, the processor may return to operation prior to operation 403. For example, when the second audio data is no longer received, the processor may return to operation 403 and may output only the first audio data. Alternatively, when the first audio data is no longer received, the processor may return to operation 403 and may output only the second audio data. In this case, the second audio data may replace the first audio data in operation 403. Alternatively, when the first audio data and the second audio data are no longer received after operation 413, the processor may return to operation prior to operation 403 and may wait to receive the first audio data.

Figure 5A:
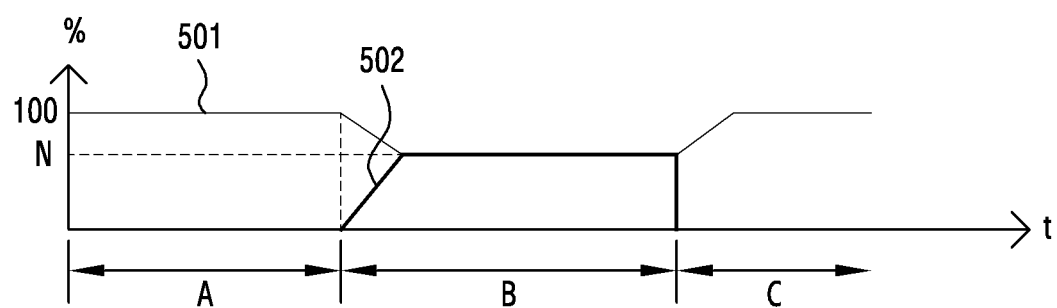
FIG. 5A illustrates an example in which an electronic device outputs pieces of audio data according to an embodiment.
Figure 5B:
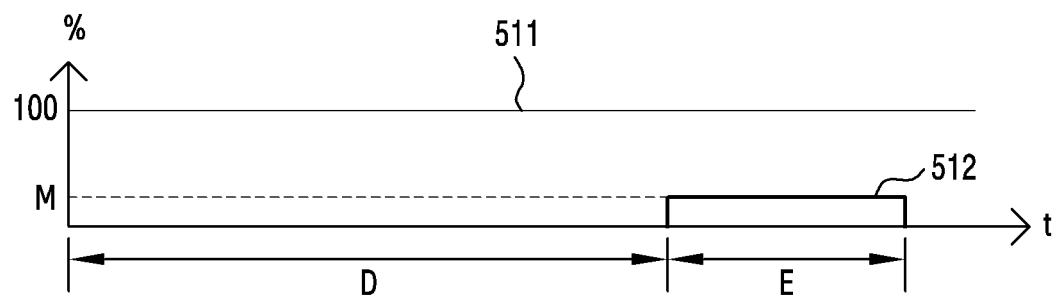
FIG. 5B illustrates an example in which an electronic device outputs pieces of audio data according to an embodiment.
Figure 5C:
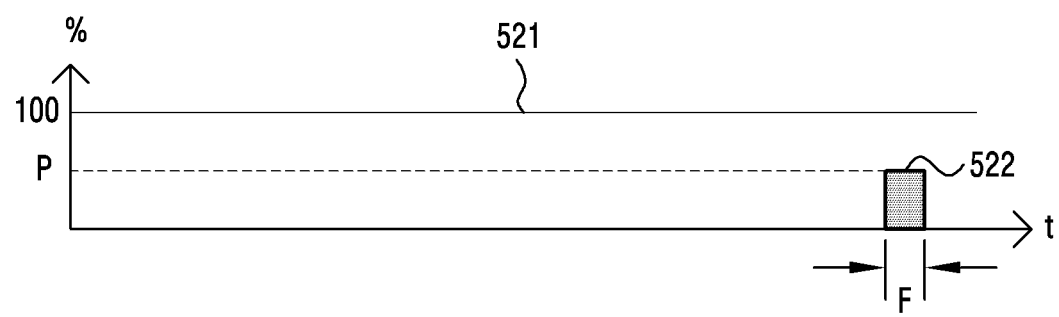
FIG. 5C illustrates an example in which an electronic device outputs pieces of audio data according to an embodiment.
Figure 5D:
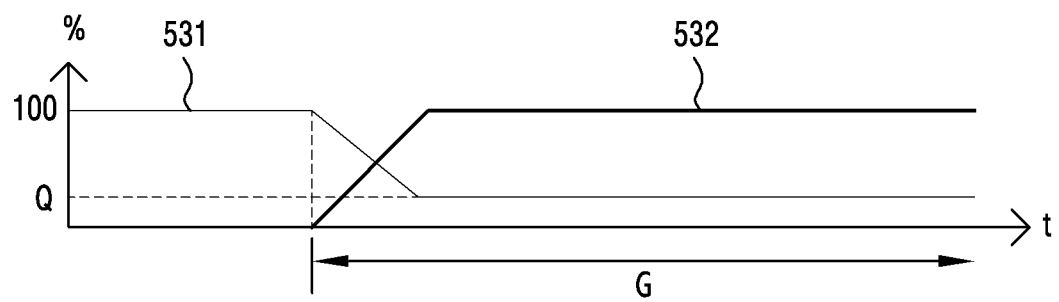
FIG. 5D illustrates an example in which an electronic device outputs pieces of audio data according to an embodiment.
Figure 5E:
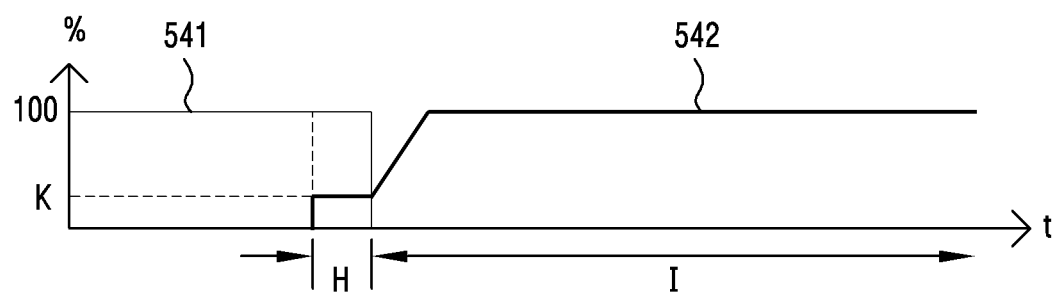
FIG. 5E illustrates an example in which an electronic device outputs pieces of audio data according to an embodiment.
Figure 5F:
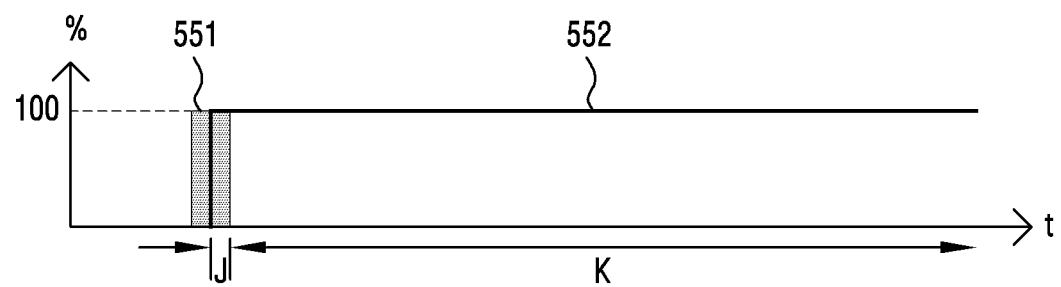
FIG. 5F illustrates an example in which an electronic device outputs pieces of audio data according to an embodiment.

FIG. 5A illustrates an example of outputting portions of audio data according to an embodiment, FIG. 5B illustrates an example of outputting pieces of audio data according to an embodiment, FIG. 5C illustrates an example of outputting pieces of audio data according to an embodiment, FIG. 5D illustrates an example of outputting pieces of audio data according to an embodiment, FIG. 5E illustrates an example of outputting pieces of audio data according to an embodiment, and FIG. 5F illustrates an example of outputting pieces of audio data according to an embodiment.

Prior to a detailed description, it is assumed in FIG. 5A to FIG. 5F that a first external electronic device has a higher priority than a second external electronic device.

Referring to FIG. 5A, when only first audio data 501 of a media type is received from the first external electronic device, an electronic device (e.g., the electronic device 100 or the electronic device 300) according to an embodiment may output the first audio data 501 at a volume of 100% (section A) (volume 100% shall be understood as being a same volume as if the audio data was the only audio data received).

According to various embodiments, when receiving second audio data 502 of a ringtone type from the second external electronic device while outputting the first audio data 501 of the media type at a volume of 100%, the electronic device may output the first audio data 501 and the second audio data 502 at a volume of N % (section B) (N % shall be understood as N % of the volume that the audio data would be played at if the audio data was the only audio data that was received). N may be a positive number less than 100. For example, the electronic device may gradually reduce (fade down) the volume of the first audio data 501 to N % and may then maintain N %, and may gradually increase (arise) the volume of the second audio data 502 to N % and may then maintain N %.

When reception of the second audio data 502 of the ringtone type terminates, the electronic device may gradually increase the volume of the first audio data from N % to 100% and may then maintain 100% (section C).

In various embodiments, first audio data 501 can be media, and second audio data 502 can be an audible alert system alert.

Referring to FIG. 5B, when only first audio data 511 of a media type is received from the first external electronic device, the electronic device according to an embodiment may output the first audio data 511 at a volume of 100% (section D).

According to various embodiments, when receiving second audio data 512 of a notification type from the second external electronic device while outputting the first audio data 511 of the media type at a volume of 100%, the electronic device may output the second audio data 512 at a volume of M % with the volume of the first audio data 511 maintained at 100% (section E). M may be a positive number less than 100. In various embodiments, first audio data 511 can be media, and second audio data 512 can be an audible alert system alert.

Referring to FIG. 5C, when receiving second audio data 522 of a system type from the second external electronic device while outputting first audio data 521 of a media type received from the first external electronic device at a volume of 100%, the electronic device according to an embodiment may output the second audio data 522 at a volume of P % with the volume of the first audio data 521 maintained at 100% (section F). P may be a positive number less than 100.

In various embodiments, first audio data 511 can be media, and second audio data 512 can be a reception notification alert of an SMS.

Referring to FIG. 5D, when receiving second audio data 532 of a media type from the second external electronic device while outputting first audio data 531 of a media type received from the first external electronic device at a volume of 100%, the electronic device according to an embodiment may gradually reduce the volume of the first audio data 531 to Q %, thus maintaining Q %, and may gradually increase the volume of the second audio data 532 to 100%, thus maintaining 100% (section G). Q may be a positive number less than 100.

According to an embodiment, the electronic device may output the first audio data 531 at a volume of 100%. For example, Q may be 100. According to another embodiment, the electronic device may output the first audio data 531 at a volume of 0%. For example, Q may be 0. This embodiment may be useful when the first audio data 531 is audio data included in a video. For example, a user may enjoy music being played on the second external electronic device through the electronic device while watching a silent video on the first external electronic device.

According to an embodiment, when the second audio data of the media type is received, the electronic device may request the first external electronic device to pause playback of the first audio data of the media type.

Referring to FIG. 5E, when receiving second audio data 542 of a media type from the second external electronic device while outputting first audio data 541 of a notification type received from the first external electronic device at a volume of 100%, the electronic device according to an embodiment may output the second audio data 542 at a volume of R % with the volume of the first audio data 541 maintained at 100% (section H). When output of the first audio data 541 is completed, the electronic device may gradually increase the volume of the second audio data 542 from R % to 100% and may maintain output of the second audio data 542 at 100% (section I).

Referring to FIG. 5F, when receiving second audio data 552 of a media type from the second external electronic device while outputting first audio data 551 of a system type received from the first external electronic device at a volume of 100%, the electronic device according to an embodiment may output the second audio data 552 at a volume of 100% with the volume of the first audio data 551 maintained at 100% (section J). When output of the first audio data 551 is completed, the electronic device may output the second audio data 552 at a volume of 100% (section K).

Figure 6:
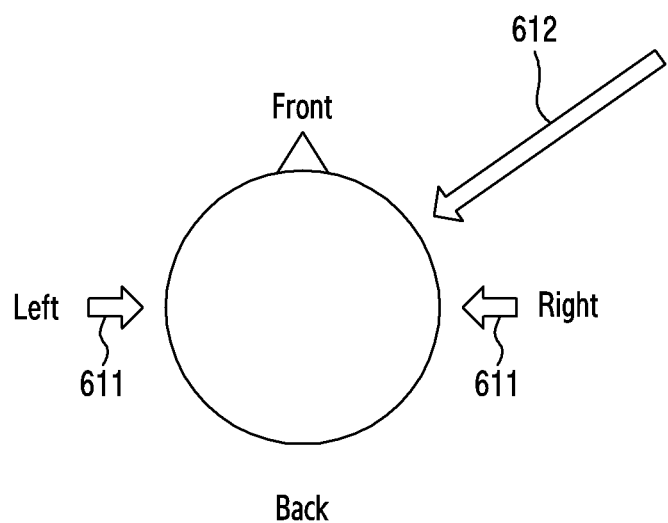
FIG. 6 illustrates an example in which an electronic device provides a sense of space according to an embodiment.

FIG. 6 illustrates an example in which an electronic device provides a sense of space according to an embodiment.

Referring to FIG. 6, an electronic device (e.g., the electronic device 100 or the electronic device 300) according to an embodiment may provide a sense of space (or spatial audio) through various known techniques (e.g., an interaural time difference (ITD) technique using the difference in arrival time of a sound between two ears or an interaural level difference (ILD) technique using the difference in loudness between two ears). For example, the electronic device may provide a sense of space by controlling an output parameter of first audio data 611 and second audio data 612 in order to help a user feel as if an external electronic device having a high priority (e.g., the first external electronic device 10) is located closer than an external electronic device having a low priority (e.g., the second external electronic device 20).

According to an embodiment, the electronic device may provide the sense of space based on the distance to the external electronic devices. For example, the electronic device may measure the strength of a reception signal received from each external electronic device through a wireless communication module (e.g., the wireless communication module 330) and may estimate the distance to each external electronic device based on the measured strength of the reception signal. The electronic device may control an output parameter of audio data received from each external electronic device based on the estimated distance, thereby providing a sense of space.

According to an embodiment, when the electronic device can identify the direction of each external electronic device or can receive the direction of each external electronic device through another connected external electronic device (e.g., an IoT device), the electronic device may provide a sense of space in consideration of the distance and/or direction of each external electronic device.

According to various embodiments, a method for controlling audio output of an electronic device (e.g., the electronic device 100, 300) may comprise: establishing a first wireless communication channel (e.g., the first wireless communication channel 11) with a first external electronic device (e.g., the first external electronic device 10); establishing a second wireless communication channel (e.g., the second wireless communication channel 21) with a second external electronic device (e.g., the second external electronic device 20); outputting, through an output module (e.g., the output module 340), first audio data received through the first wireless communication channel; identifying a priority of the first external electronic device and a priority of the second external electronic device when receiving second audio data through the second wireless communication channel while outputting the first audio data; identifying a type of the first audio data and a type of the second audio data; adjusting an output parameter of the first audio data and an output parameter of the second audio data based on the priority of the first external electronic device and the priority of the second external electronic device, the type of the first audio data, and the type of the second audio data; and outputting the first audio data using the adjusted output parameter of the first audio data and the second audio data the adjusted output parameter of the second audio data through the output module.

According to various embodiments, the identifying of the priorities may comprise one of: determining the priority of the first external electronic device and the priority of the second external electronic device based on a connection history or a playback history; determining the priority of the first external electronic device and the priority of the second external electronic device based on the type of the first audio data and the type of the second audio data; or determining the priority of the first external electronic device and the priority of the second external electronic device based on a predefined setting or a user setting.

According to various embodiments, the type of the first audio data and the type of the second audio data are classified into at least two groups, and each group comprises at least one subgroup.

According to various embodiments, the adjusting of the output parameter of the first audio data and the second audio data may comprise: controlling a volume of the first audio data and a volume of the second audio data.

According to various embodiments, the controlling of the volumes may comprise: maintaining, when the priority of the first external electronic device is high, the volume of the first audio data received from the first external electronic device 100% and reducing the volume of the second audio data received from the second external electronic device by a specified value.

According to various embodiments, the controlling of the volumes may comprise: requesting, when receiving audio data of a media type from the second external electronic device while receiving and outputting audio data of a media type from the first external electronic device, the first external electronic device to pause playback of the audio data of the media type and controlling the audio data of the media type received from the second external electronic device to be output at a volume of 100%.

According to various embodiments, the controlling of the volumes may comprise: changing, when receiving audio data of a media type from the second external electronic device while receiving and outputting audio data of a media type from the first external electronic device, the volume of the audio data of the media type received from the first external electronic device to 0% and controlling the audio data of the media type received from the second external electronic device to be output at a volume of 100%.

According to various embodiments, the controlling of the volumes may comprise: changing, when receiving audio data of a media type from the second external electronic device while receiving and outputting audio data of a media type from the first external electronic device, the volume of the audio data of the media type received from the first external electronic device to a specified value that is greater than 0% and is less than or equal to 100% and controlling the audio data of the media type received from the second external electronic device to be output at a volume of 100%.

According to various embodiments, the adjusting of the output parameters may comprise: adjusting, when the first external device has a high priority and the second external device has a low priority, the output parameter of the first audio data and the output parameter of the second audio data such that the first audio data and second output data are output at volumes corresponding to the first external device being closer to the electronic device than the second external electronic device. According to various embodiments, the adjusting of the output parameters may comprise: identifying a distance to each external electronic device based on a strength of a wireless signal of the first external electronic device and a strength of a wireless signal of the second external electronic device; and adjusting the output parameter of the first audio data and the output parameter of the second audio data according to the identified distance to provide a sense of space.

An electronic device according to various embodiments may control the audio output so as to reflect the user's intention when pieces of audio data are received from multiple external electronic devices. In addition, the electronic device may provide a sense of space such that the user can recognize external electronic devices corresponding to pieces of audio data that are being output.

The electronic device according to various embodiments may be one of various types of electronic devices that may receive and output audio signals from multiple external electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium (e.g., the memory 320) that is readable by a machine (e.g., the electronic device 100, 300). For example, a processor (e.g., the processor 310) of the machine (e.g., the electronic device 100, 300) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a wireless communication module;

a memory storing a priority of a plurality of external electronic devices;
an output module; and
a processor operatively connected to the wireless communication module, the memory, and the output module,
wherein the processor is configured to:
control the wireless communication module to establish a first wireless communication channel with a first external electronic device;
control the wireless communication module to establish a second wireless communication channel with a second external electronic device, while the first wireless communication channel is established with the first external electronic device;
control the output module to output first audio data having a first volume, the first audio data being received through the first wireless communication channel from the first external electronic device;
receive second audio data through the second wireless communication channel from the second external electronic device while outputting the first audio data having the first volume;
identify a priority of the first external electronic device and a priority of the second external electronic device based on a connection history or a playback history when receiving the second audio data through the second wireless communication channel while outputting the first audio data;
identify a type of the first audio data and a type of the second audio data;
gradually reduce percentage of a volume of the first audio data over a predetermined time to reduce the first volume of the first audio data to a second volume and gradually increase percentage of a volume of the second audio data over the predetermined time to increase the volume of the second audio data to the first volume, the first volume being greater than the second volume based on the priority of the first external electronic device, the priority of the second external electronic device, the type of the first audio data, and the type of the second audio data; and
output the first audio data having the second volume and the second audio data having the first volume through the output module.

2. The electronic device of claim 1, wherein the processor is further configured to:
determine the priority of the first external electronic device and the priority of the second external electronic device based on a predefined setting or a user setting.

3. The electronic device of claim 1, wherein the type of the first audio data and the type of the second audio data are classified into at least two groups, and each group comprises at least one subgroup.

4. The electronic device of claim 1, wherein the processor is further configured to adjust an output parameter of the first audio data and an output parameter of the second audio data by controlling a volume of the first audio data and the volume of the second audio data.

5. The electronic device of claim 4, wherein, when the priority of the first external electronic device is high, the processor is further configured to maintain the first volume of the first audio data and to reduce the volume of the second audio data to the second volume.

6. The electronic device of claim 4, wherein, when receiving audio data of a media type from the second external electronic device while receiving and outputting audio data of a media type from the first external electronic device, the processor is further configured to request the first external electronic device to pause playback of the audio data of the media type and to control the audio data of the media type received from the second external electronic device to be output at a volume of 100%.

7. The electronic device of claim 4, wherein, when receiving audio data of a media type from the second external electronic device while receiving and outputting audio data of a media type from the first external electronic device, the processor is further configured to change the volume of the audio data of the media type received from the first external electronic device to 0% and to control the audio data of the media type received from the second external electronic device to be output at a volume of 100%.

8. The electronic device of claim 4, wherein, when receiving audio data of a media type from the second external electronic device while receiving and outputting audio data of a media type from the first external electronic device, the processor is further configured to change the volume of the audio data of the media type received from the first external electronic device to a specified value that is greater than 0% and is less than or equal to 100% and to control the audio data of the media type received from the second external electronic device to be output at a volume of 100%.

9. The electronic device of claim 4, wherein the processor is further configured to adjust, when the first external electronic device has a high priority and the second external electronic device has a low priority, the output parameter of the first audio data and the output parameter of the second audio data such that the first audio data and second audio data are output at volumes corresponding to the first external electronic device being closer to the electronic device than the second external electronic device.

10. The electronic device of claim 1, wherein the processor is further configured to identify a distance to each external electronic device based on a strength of a wireless signal of the first external electronic device and a strength of a wireless signal of the second external electronic device and to adjust an output parameter of the first audio data and an output parameter of the second audio data according to the identified distance to provide a sense of space.

11. A method for controlling audio output of an electronic device, the method comprising:
establishing a first wireless communication channel with a first external electronic device;
establishing a second wireless communication channel with a second external electronic device, while the first wireless communication channel is established with the first external electronic device;
outputting, through an output module, first audio data having a first volume, the first audio data being received through the first wireless communication channel from the first external electronic device;
receiving second audio data through the second wireless communication channel from the second external electronic device while outputting the first audio data having the first volume;
identifying a priority of the first external electronic device and a priority of the second external electronic device based on a connection history or a playback history when receiving the second audio data through the second wireless communication channel while outputting the first audio data;
identifying a type of the first audio data and a type of the second audio data;

gradually reducing percentage of a volume of the first audio data over a predetermined time to reduce the first volume of the first audio data to a second volume, and gradually increasing percentage of a volume of the second audio data over the predetermined time to increase the volume of the second audio data to the first volume, the first volume being greater than the second volume based on the priority of the first external electronic device and the priority of the second external electronic device, the type of the first audio data, and the type of the second audio data; and outputting the first audio data having the second volume and the second audio data having the first volume through the output module.

12. The method of claim 11, wherein identifying of the priorities comprises of:

determining the priority of the first external electronic device and the priority of the second external electronic device based on a predefined setting or a user setting.

13. The method of claim 11, wherein the type of the first audio data and the type of the second audio data are classified into at least two groups, and each group comprises at least one subgroup.

14. The method of claim 11, further comprising:

adjusting an output parameter of the first audio data and an output parameter of the second audio data by controlling a volume of the first audio data and the volume of the second audio data.

15. The method of claim 14, wherein controlling the volumes comprises:

when the priority of the first external electronic device is high, maintaining the first volume of the first audio data and reducing the volume of the second audio data to the second volume.

16. The method of claim 14, wherein controlling the volumes comprises:

when receiving audio data of a media type from the second external electronic device while receiving and outputting audio data of a media type from the first external electronic device, requesting the first external electronic device to pause playback of the audio data of the media type and controlling the audio data of the media type received from the second external electronic device to be output at a volume of 100%.

17. The method of claim 14, wherein controlling the volumes comprises:

when receiving audio data of a media type from the second external electronic device while receiving and outputting audio data of a media type from the first external electronic device, changing the volume of the audio data of the media type received from the first external electronic device to 0% and controlling the audio data of the media type received from the second external electronic device to be output at a volume of 100%.

18. The method of claim 14, wherein controlling the volumes comprises:

when receiving audio data of a media type from the second external electronic device while receiving and outputting audio data of a media type from the first external electronic device, changing the volume of the audio data of the media type received from the first external electronic device to a specified value that is greater than 0% and is less than or equal to 100% and controlling the audio data of the media type received from the second external electronic device to be output at a volume of 100%.

19. The method of claim 14, wherein adjusting the output parameters comprises:

adjusting, when the first external electronic device has a high priority and the second external electronic device has a low priority, the output parameter of the first audio data and the output parameter of the second audio data such that the first audio data and second output data are output at volumes corresponding to the first external electronic device being closer to the electronic device than the second external electronic device.

20. The method of claim 14, wherein adjusting the output parameters comprises:

identifying a distance to each external electronic device based on a strength of a wireless signal of the first external electronic device and a strength of a wireless signal of the second external electronic device; and adjusting an output parameter of the first audio data and an output parameter of the second audio data according to the identified distance to provide a sense of space.

* * * * *